BIASED DIODE WAVE SHAPING CIRCUIT

Filed April 5, 1947

INVENTORS
VERNON J. DUKE
ELMER D. GOODALE
BY H. S. Grover
ATTORNEY

Patented Aug. 15, 1950 2,519,238

UNITED STATES PATENT OFFICE 2,519,238

BIASED DIODE WAVE SHAPING CIRCUIT

Vernon J. Duke, Rockville Centre, and Elmer D. Goodale, New Rochelle, N. Y., assignors to Radio Corporation of America, a corporation of Delaware Application April 5, 1947, Serial No. 739,636

11 Claims. (Cl. 178—44)

This invention relates to electrical signal wave compression and expansion and more particularly to wave shaping circuits of the type to be employed where requirements for broad band signal transmission are present.

Wave shaping circuits are not only required for the production of particular signal wave forms, but are often required for correction of amplitude distortion due to non-linear circuit components. Wave shaping circuits are also employed for obtaining desirable effects by intentional distortion, such as signal compression or expansion. By way of example, the explanation of the operation and employment of the present invention will be concerned primarily with the change of signal wave forms for correction of amplitude distortion and the production of desirable effects by compression and expansion.

In its application to television or the transmission of visual intelligence, electrical signal compression and expansion may very appropriately be referred to as the control of "gamma."

Gamma, or "contrast," as it is sometimes called, may be defined as a relative difference in degree of light intensity of image shading.

There are three fundamental steps in the transmission of images. These are the perception, the transfer, and the ultimate reproduction. The perception is achieved in a television camera which contains an image pickup tube. The image pickup tube must change variations in light intensity into electrical signals which, in the case of television, are transmitted to a remote location. The transferring device must carry signal intelligence representative of the image to a remote location, where the electrical signal train is reconverted into an image for perception by the eye of the observer. It immediately becomes apparent that true reproduction requires a maintenance of the contrast of the image or gamma, as well as image detail.

The effectiveness of the system may, at least in part, be characterized by its "transfer" characteristic.

For purposes of simplicity, the explanation will be limited to a monochrome type system so that the optical content of the subject matter of the image is represented by changes in light intensities only, or, as it is sometimes expressed, by variations in object brightness.

The transfer characteristic of a typical television system is not necessarily linear over its entire range. It will be seen, therefore, that compensation of some sort is desirable to improve the non-linearity of the transfer characteristic.

Each component of the system has its own individual transfer characteristic.

Throughout the discussion, it will be assumed that the origin of each transfer characteristic takes place at the same light level, such as, for example, a black level.

As changes in object brightness are impressed on the photosensitive electrode of the camera tube, there are produced corresponding changes in photoelectric current issuing from the camera tube. The variations in current produce changes in camera tube output voltages representing variations in object brightness. The relation between the two quantities may be defined as the camera transfer characteristic.

The voltage produced by the camera is amplified in the video amplifier. The video amplifier also has transfer characteristics which may be defined as a factor involving the input voltage versus its output voltage.

The television transmitter, including the radio frequency portions and their associated modulating circuits, also contains individual transfer characteristics.

A still further individual transfer characteristic may be found in the television receiving equipment. An important factor in the receiving equipment transfer characteristic resides in the image reproducing tube. The transfer characteristic of the image reproducing tube is the relation between the control voltage and the brightness of the reproduced image element.

The important relationship, considering the whole system, is the overall brightness-transfer characteristic or the relation between object brightness and the image brightness. If the amplitude and phase responses with respect to frequency are adequate, and if the synchronizing and scanning functions are adequate, the overall system may fail in gaining true reproduction if the brightness transfer characteristic is not correct.

It might be assumed that the most desirable value for an overall gamma of the system would be such that there would exist a linear relationship between object brightness and image brightness. This would insure proportional changes in brightness in subject and image. If the transfer of brightness were the only requirement of the system, a gamma of one would be desirable. However, in a television system, the transfer of brightness is not the sole requirement. The sensation produced in the mind of the observer is the ultimate gauge of the effectiveness of the system. The sensation of the system depends on the brightness, but it is not directly proportional to it. It is therefore necessary that the overall gamma of the system be controlled in order to produce the proper sensation in the observer's mind.

The Weber-Fechner law holds that the sensation produced in the mind of the observer varies logarithmically. The results of numerous experiments have established that this Weber-Fechner law is an approximation only, and that it holds with accuracy under a certain range of brightness and under specified conditions of measurement. Simple conclusions, however, have determined that the relation between the brightness in reproduction and the corresponding brightness of the objects are usually based on logarithmic law. This is customary in most photographic work.

If, therefore, we assume that the Weber-Fechner law holds with sufficient accuracy, the object sensation may be expressed as proportional to the logarithm of the object brightness, and the image sensation or the sensation produced in the mind of an observer viewing the reproduced image is proportional to the logarithm of the image brightness. The most desirable relationship, therefore, between object and image in a pictorial reproduction system of any type, such as the television system, is that the image sensation shall be directly proportional to the object sensation, and this requirement may be fulfilled for any overall value of gamma, so long as the overall transfer characteristic is a curve having a logarithmic form. Practically speaking, a gamma in the neighborhood of unity is most desirable. High values of gamma or a steep slope on the curve between object sensation and image sensation produces a contrasty effect. Conversely, a low value of gamma or a flat curve between object sensation and image sensation produces a flat image.

It will, therefore, be seen that an overall transfer characteristic which does not follow the logarithmic form will produce an image whose high lights are flat and whose shadows are contrasty.

It is known, however, that a kinescope screen does not exhibit either the intrinsic brightness range or contrast ratios available in the ordinary outdoors scene. It therefore is necessary to produce a picture with compressed contrast range on the kinescope as compared to the original scene. This compression must be so achieved as to result in a pleasant effect as far as the eye is concerned.

In order to provide for a most desirable overall transfer characteristic, it is necessary to have a gamma control having an adjustable characteristic in order to provide flexibility.

Various systems have heretofore been proposed, which include adjustment by the selection of tube characteristics. Systems involving corrections by resistors functioning in accordance with amplitude have also been suggested. Correction by degeneration and correction by division of control characteristics such as a change in gain of individual amplifier channels representative of different amplitude ranges has also been suggested.

According to this invention, an improved gamma control system is provided with simplified circuit arrangements. A serially connected diode having a shunt resistance is biased to function as an open circuit in one direction from a predetermined voltage amplitude in order to change the transfer characteristic of the circuit involving the diode and the resistor at the predetermined signal amplitude value. There is also included a proposal for the neutralization of capacitive effects in the system.

A primary object of this invention is to provide an improved signal wave shaping circuit having simplified circuit components.

Another object of this invention is to provide an improved signal wave shaping circuit having broad signal frequency handling capabilities.

Other and incidental objects of the invention will be apparent to those skilled in the art from a reading of the following specification and an inspection of the accompanying drawing in which Figures 1*a* and 1*b* show by circuit diagram two basic forms of this invention;

Figures 1A, 1B, 2:
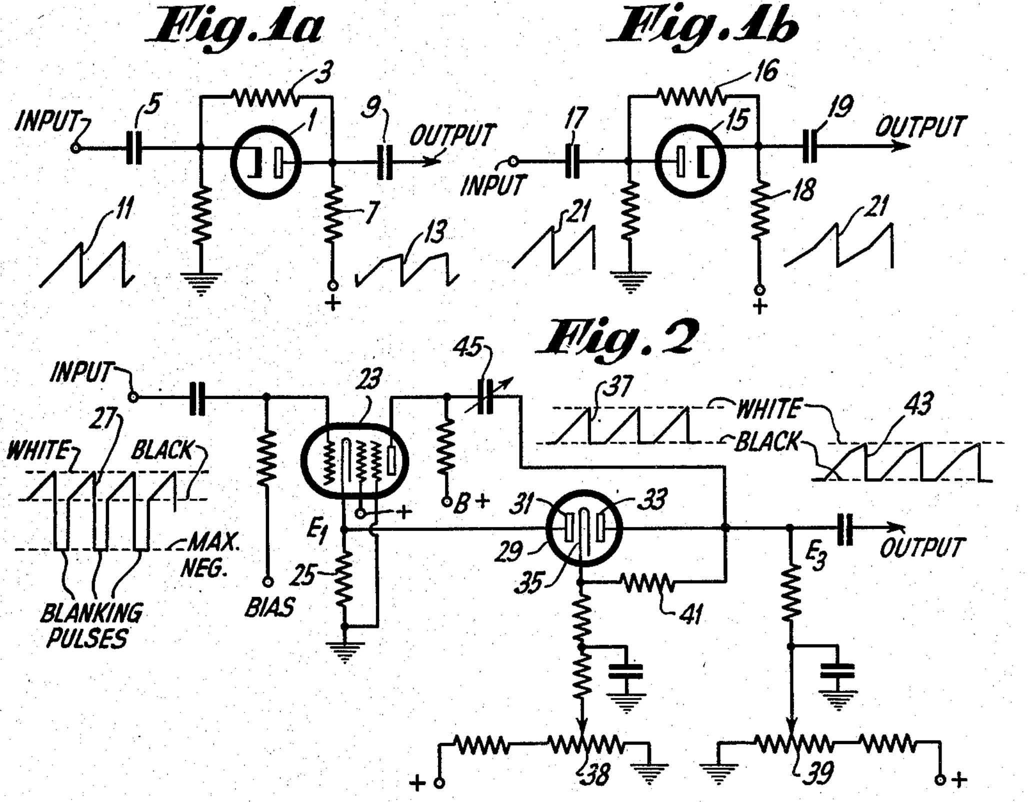
Figure 2 illustrates by circuit diagram one form of this invention.

Turning now in more detail to Figure 1*a*, there is shown a diode 1 having connected in parallel therewith a resistor 3. A signal is applied at the input to the cathode of the diode 1 through a coupling condenser 5. A bias is applied to the anode of diode 1 through resistance 7. The output signal is obtained from the anode of diode 1 through coupling condenser 9.

If a signal 11 is applied to the input circuit of Figure 1*a*, the diode conducts until such time as the potential of the cathode overtakes in a positive direction the potential of its associated anode.

The operation of a rectifying element or diode limiter may be explained as follows. The electrical characteristics of a diode are such that the tube conducts only when the plate is at a positive potential with respect to its associated cathode, or when applied to a rectifying element generally, only when one terminal is positive with respect to its other terminal. If, for example, the cathode is held at ground potential, the plate need only be positive with respect to ground for current to pass through the diode. If, however, a positive potential is placed on the cathode, the diode does not conduct until the voltage of the anode or plate rises to and above the positive potential of the cathode. Likewise, the cathode may be held at a negative potential, and the tube conducts while the plate is positive and continues to conduct while the plate is at a negative potential which is less negative than the potential of the cathode. As the plate becomes more positive with respect to the potential of the cathode, the current through the tube increases and the plate to cathode resistance decreases rapidly from an open circuit to an average value on the order of 500 ohms.

As applied to the operation of this invention, the diode or rectifying elements are so utilized that it may be considered as a switch to switch resistance of the diode or 500 ohms into the circuit or out of the circuit at a predetermined amplitude level of the signal voltage.

Returning now to Figure 1*a*, it will be seen that the diode 1 is conducting until the potential of its cathode rises in a positive direction to the potential of the bias potential source. When the cathode of diode 1 exceeds in a positive direction the potential of its associated anode, the diode 1 ceases to be conducting, or in effect, a 500 ohm resistance is removed from the circuit parallel with resistance 3. The series resistance is therefore increased, and there will result a hump in the output signal wave, as illustrated in curve 13.

It will be seen that the potential of the biasing battery will govern the position of the break in linearity on the curve 13.

Turning now to Figure 1*b*, there is illustrated another form of this invention wherein the input signal is applied to the anode of diode 15 through the coupling capacity 17. Diode 15 has connected in parallel therewith a resistor 16. A bias potential is applied to the cathode of diode 15 through a resistor 17, and the output signal is obtained from the diode cathode through condenser 19.

In accordance with the operation of the diode as described under Figure 1*a*, the input signal 21 flows through resistor 16 until such time as the input potential reaches the biasing potential, at which time the anode or plate of diode 15 exceeds in a positive direction its associated cathode. This causes the diode 15 to become conducting so that above the biasing potential, diode 15 becomes conducting thus reducing the series resistance to the signal. There results an expanded signal train, as shown in curve 21.

Turning now to Figure 2, there is shown a tube 23 having a push-pull output which may be obtained through a cathode follower circuit employing resistance 25 and the anode circuit of the tube 23.

The signal applied to the input of tube 23 may, for example, be of the type shown by curve 27. This contains, for example, a television signal employing an image signal having a uniform slope from black to white. Blanking pulses are also included, which carry the signal 27 to a maximum negative.

A dual diode 29 contains an anode 31, an anode 33 and a common cathode 35. The anode 31 is connected to the cathode of tube 23 to obtain the signal train illustrated in curve 27. A bias potential is applied to the cathode 35 such that the negative blanking pulses are clipped off from the signal. There results a signal train having the form illustrated in curve 37. The level at which the signal is clipped is determined by the biasing potential on the cathode obtained through potentiometer 38. This is normally set at black level in the operation of television systems. Further detail regarding clipping the black level and D.-C. reinsertion may be obtained by a review of the prior art on this subject, for example, the following U. S. Patents to Karl R. Wendt: No. 2,299,944 and No. 2,299,945, both dated October 27, 1942.

The anode 33 of the diode 29 obtains a bias through potentiometer 39. A resistance 41 is connected in parallel with the section of the diode including cathode 35 and anode 33. It will be seen, in accordance with the explanation in Figures 1*a* and 1*b* above, that the section of the diode including cathode 35 and 33 will conduct until the cathode 35 reaches and exceeds in a positive direction the potential of anode 33, at which time the section of the diode containing cathode 35 and anode 33 changes to an open circuit so that the output current flows only through resistance 41 for input signal potentials above the biasing potential obtained through potentiometer 39. The resultant output signal will therefore take the form of the signal wave shown by curve 43.

It is well known that capacitance exists between any two pieces of metal separated by an insulating material. The amount of capacitance depends upon the size of the metal pieces, the distance between them, and the type of dielectric. The electrodes of a vacuum tube are, of course, no exception to this rule, and have a similar characteristic known as inter-electrode capacitance. The direct capacity that exists in a diode is the cathode to plate capacitance. To the capacity of the tube may be included the circuit connections.

At high frequencies, the capacity between electrodes of the tube may provide an amplitude distortion which is undesirable. This internal capacity may be neutralized, however, by applying to the output electrode of the tube a signal voltage having a 180° phase difference. This may be obtained through an auxiliary neutralizing condenser whose capacity is equal to the capacity between the electrodes of the tube and the capacity between the associated wiring circuits.

In my U. S. Patent No. 2,353,018, dated July 4, 1944, there is shown and described a system for neutralizing the capacity of a diode following an amplifier tube.

By providing a neutralizing condenser 45 connected between the plate of tube 23 and the plate 33 of diode 29, the inter-electrode capacity of the dual diode 29 may be neutralized in such a manner as to eliminate any amplitude distortion resulting from a capacity coupling between plate 31 and plate 33 of dual diode 29.

In still another form of the invention not illustrated, the neutralizing condenser 45 may be connected between the plate of tube 23 and the cathode 35 of tube 29. This will result in neutralization of the interelectrode capacity in tube 29 resulting from the capacity between plate 31 and cathode 35.

It will be understood that the anode of tube 23 may provide the primary signal while the cathode of tube 23 provides the neutralizing signal. It will also be understood that the dual diode 29 may take the form of a plurality of individual diodes, and the individual diodes may be connected in such a manner as to furnish the desired shaping of the output signal.

Figure 3:
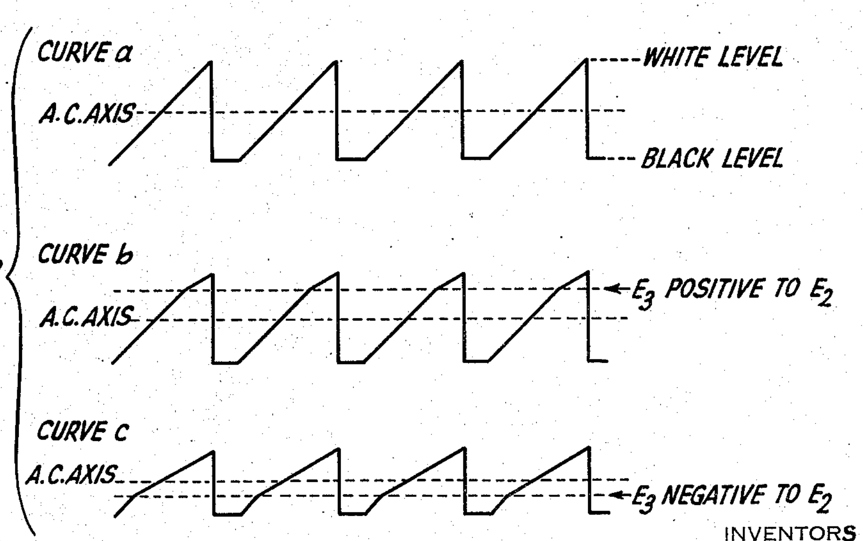
Figure 3 illustrates graphically the operation of another form of this invention.

Turning now to Figure 3, there is shown a typical clipped television signal including, for example, a black level and a white level. It will be seen that A.-C. axis exists somewhere between the white and black level, as illustrated in curve A of Figure 3.

If the value of $E_3$ of Figure 2 is positive with respect to the value of $E_2$, the beginning of compression of the signal will occur above the A.-C. axis, as illustrated in curve B of Figure 3.

If, however, the potential $E_3$ is negative with respect to the potential $E_2$, the hump or the start of the compression will begin below the A.-C. axis, as illustrated in curve C.

Having thus described the invention, what is claimed is:

1. A signal wave shaping circuit comprising in combination a source of push-pull signal waves, a serially connected rectifying element connected to one side of said source of signal waves, said rectifying element having a resistance element connected in parallel therewith, means for applying a predetermined bias potential across said rectifying element, and a neutralizing condenser having substantially the same capacity as the capacity of said rectifying element, said neutralizing condenser connected between the load terminal of said rectifying element and the side of said push-pull source of signal waves other than the side to which is connected said rectifying element.

2. A signal wave shaping circuit comprising in combination a source of push-pull signal waves, serially connected diode connected to one side of said source of signal waves, said diode having a resistance element connected only in parallel therewith, means for applying a predetermined bias potential across said diode, and a neutralizing condenser having substantially the same capacity as the capacity of said diode, said neutralizing condenser connected between the load terminal of said diode and the side of said push-pull source of signal waves other than the side to which is connected said diode.

3. A signal wave shaping circuit comprising in combination a serially connected rectifying element adapted to receive a signal wave, said rectifying element having a resistance element connected in parallel therewith, said resistance element having no point thereof connected to a point of fixed potential means for applying a predetermined bias potential across said rectifying element, and a neutralizing condenser having substantially the same capacity as the capacity of said rectifying element, said neutralizing condenser connected to said rectifying element at its load terminal and adapted to receive at its other terminal a signal wave 180° out of phase in amplitude with said signal wave applied to said rectifying element.

4. A signal wave shaping circuit comprising in combination a tube having at least an input electrode, an output electrode and a cathode electrode, a diode, means effectively connecting one electrode of said diode to said cathode electrode, a resistance element connected across only said diode, means for applying signalling impulses to said input electrode, means for providing variable bias upon the diode, and capacitive means connected between the other electrode of said diode and said output electrode of the tube for balancing the capacity of said diode.

5. A signal wave shaping circuit comprising in combination a tube having at least an input electrode, an output electrode and a cathode electrode, a diode having a cathode and an anode, means effectively connecting the cathode of said diode connected to said cathode electrode, said diode having a resistance element connected in parallel therewith, means for applying signalling impulses to said input electrode, means for providing variable bias upon the diode, and capacitive means connected between therefor the anode of said diode and the output electrode of the tube for balancing the capacity of said diode.

6. A signal wave shaping circuit comprising in combination a source of push-pull signal waves, a first and second rectifying element connected serially with each other and connected serially to one side of said source of signal waves, said second serially connected rectifying element having a resistance element connected in parallel therewith, said resistance element having no intermediate connections, means for providing bias upon each of said rectifying elements to determine the signal level at which signal is passed through the rectifying elements, and a neutralizing condenser having substantially the same capacity as the overall capacity of said serially connected rectifying elements, said neutralizing condenser connected between the load terminal of said rectifying elements and the side of said push-pull source of signal waves other than the side to which is connected said rectifying elements.

7. A signal wave shaping circuit comprising in combination a source of push-pull signal waves, a pair of serially connected rectifying elements connected serially to one side of said source of signal waves, a resistance element having only two terminals one of said rectifying elements having said resistance element connected directly in parallel therewith, means for providing bias potentials, independent of each other, upon each of said rectifying elements to determine the signal level at which signal is passed through the rectifying elements, and a neutralizing condenser having substantially the same capacity as the overall capacity of said serially connected rectifying elements, said neutralizing condenser connected between the load terminal of said rectifying elements and the side of said push-pull source of signal waves other than the side to which is connected said rectifying elements.

8. A signal wave shaping circuit comprising in combination a source of push-pull signal waves, a pair of serially connected diodes each having a signal input and signal output terminal and one of which is connected to one side of said source of signal waves, one of said diodes having a resistance element connected only to the terminals thereof, means for providing bias potentials, independent of each other, upon each of said diodes to determine the signal level at which signal is passed through the diodes, and a neutralizing condenser having substantially the same capacity as the overall capacity of said serially connected diodes, said neutralizing condenser connected between the load terminal of said diodes and the side of said push-pull source of signal waves other than the side to which is connected said diodes.

9. A signal wave shaping circuit comprising in combination a tube having at least an input electrode, an output electrode and a cathode electrode, a pair of serially connected diodes connected serially to said cathode, one of said diodes having connected in parallel therewith a resistance element having no other connections, means for applying signalling impulses to said input electrode, means for providing independently variable bias potentials upon each of said diodes to determine the signal level at which signal energy is passed through the diodes, and a neutralizing condenser having substantially the same capacity as the series capacity of said pair of serially connected diodes, said neutralizing condenser connected between the load terminal of said diodes and the output electrode of the tube for balancing the capacity of said diodes.

10. A signal wave shaping circuit comprising in combination a tube having an input electrode, a first output electrode and a second output electrode having an output signal 180° out of amplitude phase with the first output electrode, a dual diode having a first anode, a second anode and a cathode common to both the anodes, the first anode of said diode connected to the first output electrode of said tube, a resistance element connected between one of the anodes of said diode and the associated diode cathode, means for applying signalling impulses to said input electrode, means for applying bias potential to said diode cathode, means for applying bias potential to one of the anodes of said diode, and a neutralizing condenser having substantially the same capacity as the anode to anode capacity of said dual diode, said neutralizing condenser connected between the second output electrode of said tube and the second anode of said diode.

11. A signal wave shaping circuit comprising in combination a tube having an input electrode, a first output electrode and a second output electrode having an output signal 180° out of amplitude phase with the first output electrode, a dual diode having a first anode, a second anode and a cathode common to both the anodes, the first anode of said diode connected to the first output electrode of said tube, a resistance element connected between the second anode of said diode and the associated diode cathode, means for applying signalling impulses to said input electrode, means for applying bias potential to said diode cathode, means for applying bias potential to the second anode of said diode, and a neutralizing condenser having substantially the same capacity as the anode to anode capacity of said diode, said neutralizing condenser connected between the second output electrode of said tube and the second anode of said diode.

VERNON J. DUKE.
ELMER D. GOODALE.

REFERENCES CITED

The following references are of record in the file of this patent:

UNITED STATES PATENTS

| Number | Name | Date |
|---|---|---|
| 2,255,691 | Wilson | Sept. 9, 1941 |
| 2,255,692 | Wilson | Sept. 9, 1941 |
| 2,259,520 | Freeman | Oct. 21, 1941 |
| 2,338,412 | Dallos | Jan. 4, 1944 |
| 2,353,018 | Duke | July 4, 1944 |